July 24, 1934.  R. H. PARK  1,967,899
REGULATOR
Filed May 7, 1931
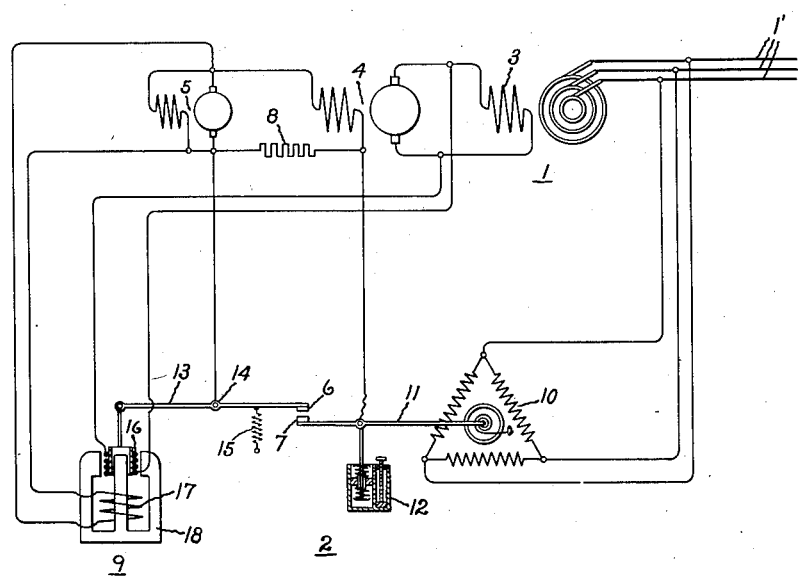
Inventor:
Robert H. Park,
by Charles A. Mueller
His Attorney.

Patented July 24, 1934

1,967,899

UNITED STATES PATENT OFFICE 1,967,899

REGULATOR

Robert H. Park, Pembroke, Mass., assignor to General Electric Company, a corporation of New York Application May 7, 1931, Serial No. 535,701

11 Claims. (Cl. 171—229)

My invention relates to regulators and particularly to improvements in the anti-hunting means of vibratory contact electrical regulators.

The operating means of the anti-hunting assembly of the usual vibratory contact type regulator is an ordinary solenoid. As is well known the pull of a solenoid varies as the square of the voltage applied to it. This non-linear parabolic relation between the pull of the anti-hunting magnet and the voltage applied thereto results in a number of disadvantageous effects in the operation of the regulator. Among these disadvantageous effects is improper and weak action when the regulator is regulating the voltage of a synchronous machine which is operating above its steady state condition. Another such effect is that the necessary vibratory action of the anti-hunting means is seriously curtailed during low excitation conditions on the regulated machine. Still another disadvantageous effect is the necessity of using a compound restraining spring for opposing the pull of the anti-hunting magnet.

In accordance with my invention I provide a novel anti-hunting magnet, which I will refer to as a polarized magnet, which has a linear relation between its pull and the voltage applied to it.

An object of my invention is to provide an improved regulator.

Another object of my invention is to provide improved anti-hunting means for vibratory contact type regulators.

My invention will be better understood from the following description taken in connection with the single figure of the accompanying diagrammatic drawing and its scope will be pointed out in the appended claims.

Referring now to the single figure of the accompanying drawing, wherein I have shown an embodiment of my invention as applied by way of example to a regulator of the Tirrill type for controlling the voltage of a polyphase machine, 1 is the machine to be regulated and 2 is the regulator connected thereto. Machine 1 will be considered as a synchronous generator although it will be obvious to those skilled in the art that it might also be a synchronous motor or synchronous condenser. In fact, as the description of my invention proceeds it will become obvious to those skilled in the art that it is immaterial to my invention whether the regulated machine is a direct or alternating current machine or whether the regulated condition is an electrical condition or any other operating condition of the regulated machine. Machine 1 is connected to supply energy to a load circuit 1' and has a field winding 3 which is energized from any convenient variable voltage source, such as an exciter 4. The field winding of exciter 4 may be either shunt connected or may be separately excited from a sub-exciter 5, as shown.

The regulation of machine 1 is secured in the usual manner by varying the resistance of the exciter field circuit which consequently varies the excitation of the regulated machine. This variation in the resistance of the exciter field circuit is secured by a vibratory action of a pair of contacts 6 and 7 across a regulating resistance 8 in the exciter field winding circuit.

With the principal exception of the special anti-hunting magnet 9 regulator 2 is similar to the conventional Tirrill type vibratory contact voltage regulator which is now provided with a three phase responsive torque motor type main control element, as is described and claimed in my prior Patent No. 1,743,798 granted January 14, 1930, to the assignee of the present application. This torque motor main control element is illustrated at 10 and consists essentially of a three phase induction motor connected to circuit 1' so as to produce a counterclockwise torque which varies in accordance with variations in the voltage of circuit 1' and biasing means tending to produce rotation of the motor in a clockwise direction. This motor is mechanically connected through lever 11 to main control contact 7 and any suitable means, such as spring dashpot 12, is provided for damping out any incipient vibration in this lever.

The anti-hunting assembly of regulator 2 comprises an anti-hunting lever 13 which is pivotally mounted at 14 and which carries on one end the anti-hunting contact 6, for cooperation with main contact 7 and which is connected at the other end to my polarized anti-hunting magnet 9. A simple, linear pull characteristic resilient restraining member, shown as spring 15, is connected to lever 13 so as to oppose the pull of my anti-hunting magnet 9.

My novel anti-hunting magnet 9 consists essentially of a main coil 16 which is placed in a uniform magnetic field of constant intensity. It is immaterial to my invention, in its broader aspects, how this field is produced and in the illustrated embodiment of my invention I have shown it as being produced by a polarizing coil 17 which is wound on a core 18 which is so arranged with respect to main coil 16 as to cause the flux produced by coil 17 to produce a uniform and constant magnetic field. This field can be made independent of variations in voltage applied to coil 17 by working core 18 beyond saturation. With this arrangement the pull of coil 16 will be directly proportional to the current flowing therethrough regardless of its position.

During normal conditions, that is to say, during normal load and voltage conditions on circuit 1' and with machines 1, 4 and 5 being operated in their usual manner regulator 2 operates in the same way that the usual Tirrill voltage regulator operates. Briefly this operation is as follows: As the voltage of circuit 1' is constant, the main contact 7 of the regulator will be stationary at a position which is determined by the balance between the biasing means of motor 10 and the torque produced by this motor. With anti-hunting contact 6 in the position shown the short-circuit around regulating resistance 8 will be opened with the result that minimum excitation conditions will obtain in the exciter and in the field winding of the main machine. This will cause the voltage of exciter 4 to drop with the result that the energization and consequently the pull of the anti-hunting magnet 9 will decrease thereby allowing spring 15 to pull contact 6 into engagement with contact 7. As soon as this takes place resistance 8 is short-circuited and an increase in excitation will take place in the field winding of exciter 4. This will raise the exciter voltage which in turn will cause an increased pull in the anti-hunting magnet with the result that spring 15 will be over-powered and the contacts will separate. This action is extremely rapid and results in an average current flow in the field winding 3 of the main machine 1, the pulsations in this current being so small that the voltage on circuit 1' is substantially constant. If now the voltage of circuit 1' should fall slightly contact 6 would move upwardly. This will cause anti-hunting lever 12 to vibrate about a new mean position corresponding to a position of greater average exciter voltage. As soon as this increased exciter voltage increases the voltage of the main machine to normal, contact 7 will stop and the regulator will act to hold constant voltage. Similarly, if the voltage on circuit 2 should rise slightly contact 7 will move downwardly, thereby causing a decrease in the excitation of exciter 4 to a point where the voltage of the main machine again returns to normal. It will thus be seen that under normal conditions my regulator acts like any other ordinary Tirrill type regulator.

Consider now the action of my regulator when a severe drop in voltage, such as that occasioned by a short-circuit on power circuit 1', takes place. The criterion for regulator operation under such conditions is as follows: The regulator should cause a change in exciter volts such that the field current produced by the field transient in the main machine is maintained. That is to say, when a short circuit occurs on a synchronous machine, such as a synchronous generator, it is the equivalent of producing a very heavy load on the machine and if the field excitation of the machine is not increased rapidly enough to maintain the relatively high value of field current which is produced by the transient current induced in the field due to the large short circuit current flowing in the armature of the machine, the machine will in most cases break out of synchronism with the rest of the system. In order that a vibratory contact regulator should be able to cause this rapid increase in exciter current it is necessary that its contacts should remain in engagement without any relative vibratory action during the time that the main control contact is rising. In a regulator provided with a solenoid anti-hunting magnet it is difficult to secure this result in any case and practically impossible to secure this result and at the same time have the anti-hunting means act properly during low excitation, high voltage conditions. This is because with the ordinary solenoid its pull varies as the square of its supply voltage and therefore as the main control contact rises the pull on the usual anti-hunting solenoid will vary substantially as the square of the upward displacement of the main control contact with the result that the anti-hunting contact is bound to leave the main control contact for an instant. This results in an objectionable vibratory action at a time when the regulator should be increasing the excitation as rapidly as possible.

With my special anti-hunting magnet on the other hand there is a linear relation between its pull and its voltage which means that for all base values of voltage applied to the anti-hunting magnet equal increments of pull will be produced by equal increments of voltage change from the base value. With such an arrangement it will be seen that the tendency of the anti-hunting contact to leave the main control contact during boosts in excitation is effectively checked.

Consider now the action of my regulator during low excitation, or high voltage, conditions as compared with the action of the usual regulator having a solenoid anti-hunting magnet. Under these conditions, which usually correspond to low load conditions on the synchronous generator, it is of course important that the regulator should hold a steady constant normal voltage. This means that in a regulator of the vibratory contact type the vibratory action of the contacts should be maintained at the usual rapid rate. However, when a solenoid anti-hunting magnet is employed the low base value of voltage applied to the magnet during no load conditions means that the usual changes in exciter volts from this base value will cause very slight changes in pull of the magnet. As a consequence it will require relatively large changes in exciter voltage to cause the anti-hunting contact to vibrate at light load conditions with the result that an objectionable voltage fluctation is produced in the voltage at the terminals of the main machine.

With my special anti-hunting magnet on the other hand, the same small changes in voltage from the low base value of exciter voltage as take place from the base value of the exciter voltage under normal conditions will cause the same changes in pull by my anti-hunting magnet and as result just as good regulation will be secured during low excitation conditions as during high excitation conditions.

In the usual vibratory contact type regulator the shortcomings of the ordinary solenoid anti-hunting magnet are to some extent compensated for by the special compound spring restraining element employed. This restraining element usually comprises four springs so arranged that they pick up cumulatively as the anti-hunting contact moves from its lowest position to its highest position. In this manner a roughly parabolic spring characteristic may be obtained for balancing the parabolic pull characteristic of the solenoid. However, the characteristic obtained is merely an approximation of a parabolic characteristic and does not produce the smooth action produced by my arrangement, which requires but one spring.

While I have shown and described a particular embodiment of my invention it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. The combination with a dynamo electric machine, of an exciter therefor, a sub-exciter for said exciter, a vibratory contact regulator for said machine having an anti-hunting magnet including a main coil and a polarizing coil, said main coil being connected across said exciter and said polarizing coil being connected across said sub-exciter.

2. The combination with a regulator, of an anti-hunting magnet therefor comprising a movable coil, means for energizing said coil with direct current, and means for subjecting said coil to a magnetic field of substantially constant intensity.

3. The combination with a regulator, of an anti-hunting coil, means for energizing said coil with direct current, and means for giving said coil a linear relation between its pull and its voltage.

4. The combination with a vibratory contact type regulator, of an anti-hunting coil, means for energizing said coil with direct current, and means for causing said coil to have a variation in pull for a given variation in voltage applied thereto which is the same at all base values of voltage applied thereto.

5. The combination with a vibratory contact type regulator, of a direct current anti-hunting magnet consisting essentially of a source of substantially uniform magnetic flux, a conductor in said flux, and means for passing a direct current through said conductor.

6. The combination with a vibratory contact type regulator, of an anti-hunting assembly including a magnet, means for energizing said magnet with direct current, a restraining element, a contact movable in accordance with an unbalance between the forces of said magnet and restraining element, and means for causing said contact to move in a uniform linear manner with variations in the voltage applied to said magnet.

7. The combination with a dynamo-electric machine having a field winding, of a vibratory contact type regulator having an anti-hunting magnet, means for energizing said magnet with direct current in accordance with the energization of said field winding, and means for making the force per unit change in excitation in said magnet independent of the degree of excitation of said field winding.

8. An anti-hunting magnet assembly for a regulator comprising means for producing a uniform magnetic field of substantially constant intensity, a coil in said field, means for energizing said coil with direct current, and means permitting relative movement between said field producing means and said coil.

9. An anti-hunting magnet assembly for a vibratory contact type electrical regulator comprising a magnetic circuit of magnetic material having an air gap therein, means for producing a substantially constant flux in said circuit, an anti-hunting coil movably mounted in said air gap with its axis substantially perpendicular to the direction of the flux in said air gap, and means for energizing said coil with direct current.

10. A vibratory regulating system having, in combination, an anti-hunting magnet including a coil, means for producing a substantially uniform magnetic field about said coil, and means for energizing said coil with a pulsating direct current whose average value is variable.

11. In combination, a dynamo-electric machine having a field winding circuit, means for energizing said field winding circuit with direct current, a vibratory regulator for said machine for producing a pulsating energization of said circuit whose average value is variable, an anti-hunting coil for said regulator connected to said field winding circuit so as to be energized with a pulsating direct current whose average value is variable, and means for producing a substantially uniform magnetic field about said coil.

ROBERT H. PARK.